A. M. RAWSON.
SHIPPING PACKAGE.
No. 173,813. Patented Feb. 22, 1876.
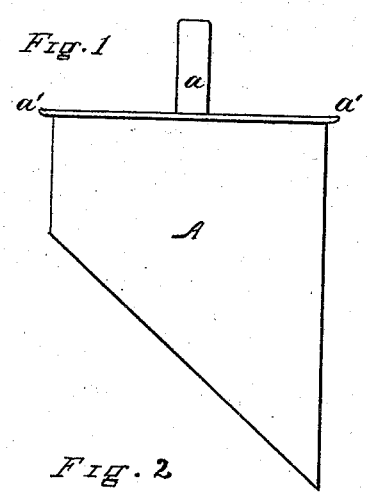
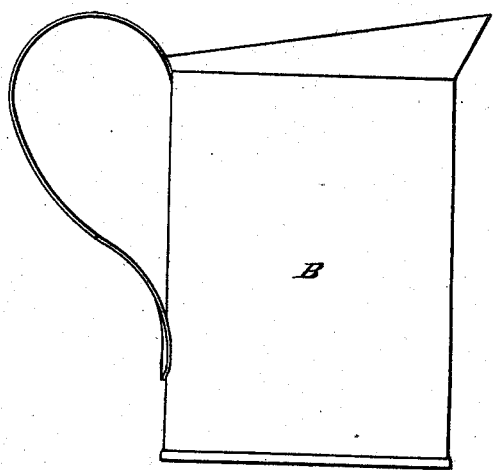
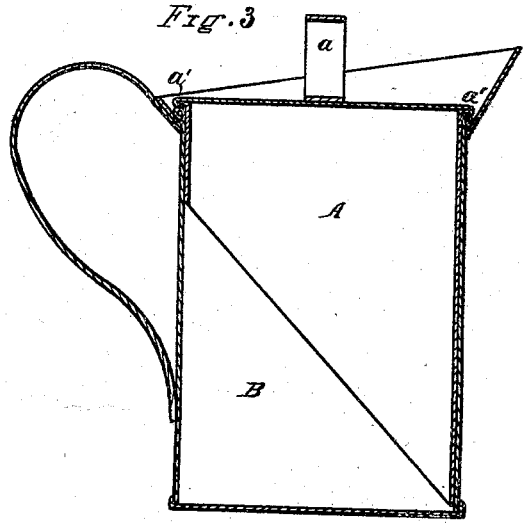
WITNESSES
N. C. Gridley
F. F. Warner
INVENTOR
Abel M. Rawson

UNITED STATES PATENT OFFICE.

ABEL M. RAWSON, OF CHICAGO, ILLINOIS.

IMPROVEMENT IN SHIPPING-PACKAGES.

Specification forming part of Letters Patent No. 173,813, dated February 22, 1876; application filed December 7, 1875.

*To all whom it may concern:*

Be it known that I, ABEL M. RAWSON, of Chicago, in the county of Cook and State of Illinois, have invented a new, useful, and Improved Shipping-Package, of which the following is a full, clear, and exact description, which will enable others skilled in the art to which my invention appertains to make and use the said package, reference being had to the accompanying drawing forming a part hereof, and in which—

Figure 1 is a side elevation of a scoop constituting a part of my invention; Fig. 2, a like representation of a measuring-vessel, and Fig. 3, a vertical central section through both devices when arranged together to form a shipping-package.

Like letters of reference indicate like parts.

Measuring-vessels, such as quart-measures, for example, are not only convenient for the particular purpose for which they are intended, but also for carrying from one place to another the liquid or other contents measured by them, so that the contents need not be unnecessarily transferred from one vessel to another. In using measuring-vessels for the purpose last above referred to, the contents are liable to be spilled, and dust and other foreign substances may fall into the vessel. For these reasons these vessels cannot alone be employed with advantage to ship goods to distant points. There are various articles, however—such as yeast-powders, for example—which are or may be shipped with advantage in measured amounts or quantities, and in packages each designed to hold a given quantity. These packages, however, are generally of no use after they have served this end.

The object of my invention is twofold: First, to prevent the contents from being spilled, and to keep out dust and dirt; and, second, to accomplish this in such a manner that not only the measuring-vessel, after it has performed the office of a shipping-package, may be used as a measurer, but also so that the cover may be used as a grocer's scoop. To this end, my invention consists in the attachment to a measuring-vessel of a grocer's scoop in such a manner that the latter will constitute a removable lid or cover to the vessel, substantially as hereinafter specified.

In the drawing, A represents an ordinary sheet-metal scoop, provided with a lifting ring or handle, *a*, and such as is commonly used by grocers in their business for the purpose of scooping up certain goods in small amounts. B is a sheet-metal measuring-vessel adapted to hold a given quantity when filled.

In the example shown, the vessel is provided with a pouring-lip and a handle; but these parts are not essential to my invention, as will hereinafter appear.

In order to accomplish the results above set forth, I make the scoop A to fit nicely into the measure B, as represented in Fig. 3. The downward movement of the scoop may be limited either by means of the flange $a'$, arranged to rest upon the upper edge of the vessel B, or by making the point of the scoop of such a length that it will strike the bottom of the vessel by the time the scoop is pushed down sufficiently to serve as a cover to the package thus formed.

It will be perceived from the foregoing description that the measure may be filled with yeast-powders or other material to be shipped therein, the quantity of which will be thus limited and determined, and that the contents may then be shipped in the same vessel by employing the scoop in the manner set forth, and that both parts, when employed together in this manner, constitute a shipping-package which will effectually protect the contents. It is also obvious that he who buys the package may afterward use both the scoop and the measure for the purposes for which they were originally intended.

Having thus described my invention, what I claim as new, and desire to secure by Letters Patent, is—

A shipping-package, consisting of a measuring-vessel provided with a grocer's scoop serving as a cover, and arranged together substantially as and for the purposes specified.

ABEL M. RAWSON.

Witnesses:
F. A. HERRING,
N. C. GRIDLEY.